UNITED STATES PATENT OFFICE.

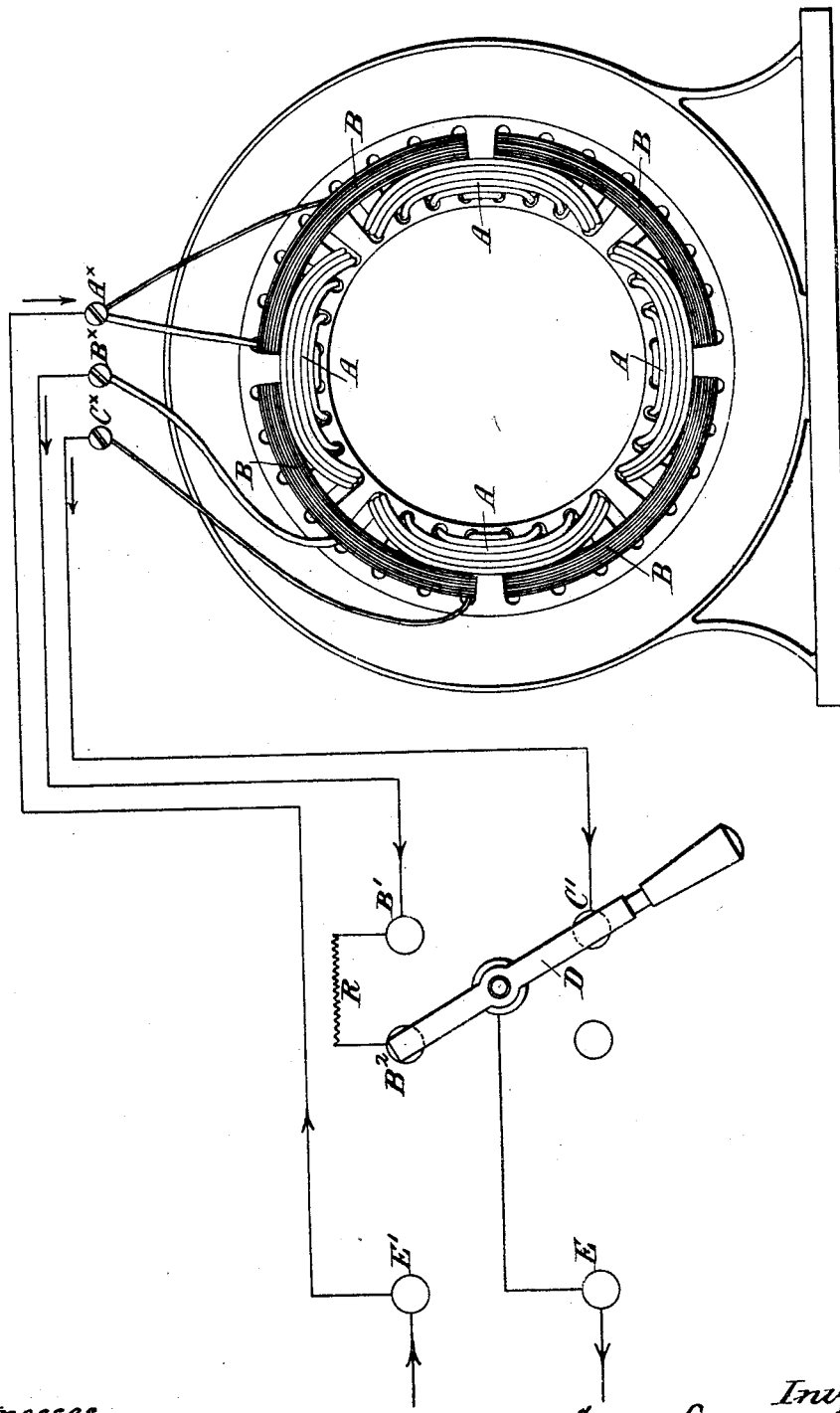

WALTER LANGDON-DAVIES, OF LONDON, ENGLAND, ASSIGNOR TO THE DAVIES MOTOR COMPANY, LIMITED, OF SAME PLACE.

ALTERNATING-CURRENT MOTOR.

SPECIFICATION forming part of Letters Patent No. 601,023, dated March 22, 1898.

Application filed November 15, 1897. Serial No. 658,591. (No model.)

*To all whom it may concern:*

Be it known that I, WALTER LANGDON-DAVIES, a subject of the Queen of Great Britain, residing at 16 Red Lion street, Clerkenwell, London, England, have invented certain new and useful Improvements in Alternating-Current Motors, of which the following is a specification.

In single-phase motors as now ordinarily constructed the energizing-current passes, when the motor is running, through a single set of coils, which may be in series. These are called the "running-coils." They have as low resistance as possible. Such a motor will not start from rest. To start it, another set of coils, which may also be in series with each other, are used in addition to the running-coils. These are called the "starting-coils" and are set at an angle to the running-coils. They are wound with fewer turns than the running-coils and a resistance or condenser is added in series with them to reduce the lag (behind the volts) of the current flowing in them. They are then joined in parallel to the running-coils. The current therefore lags behind the volts less in the starting-coils than in the running ones, and thus a rotating field is obtained by which the motor is started. A choking-coil is sometimes put in series with the running-coils to increase their angle of lag. This method of starting has this inconvenience, that the running-coil is put straight onto the mains when the machine is at rest, under which circumstances it takes a large and wasteful amount of current, or if a choking-coil is added there is a loss of efficiency. This is a necessity if the running-coils are properly wound for running.

According to my invention I wind the running-coil as usual; but instead of using it as before I add resistance to it when starting, and thus reduce the lag of the current through it behind the volts. The second or starting coil I wind of a larger number of turns, so as to have a large self-induction and as low a resistance as possible, so that the lag of the current behind the volts is large. The running-coil now lags less than the starting-coil and the rotating field is more economically obtained. When the motor has attained sufficient speed to allow of its being driven synchronously, current is cut off from the starting-coils and the resistance cut out of the running-coil circuit.

The figure shows in end view an example of the field-magnet ring of an electric motor thus wound with starting and running coils and having switch connections shown diagrammatically for putting a resistance into the circuit of the running-coils at the time of starting.

The field-magnet ring is shown to be formed, as heretofore, of numerous thin rings of sheet-iron held together side by side and each having slots cut through it for the windings to pass through.

The armature may be of the well-known squirrel-cage or of other suitable construction.

A are the running-coils, with the ends of the winding carried to terminals $A^\times$ $B^\times$.

B are the starting-coils, of more numerous turns and usually of thinner wire to occupy less space and with the ends of the windings carried to the terminals $A^\times$ $C^\times$.

The terminal $C^\times$ is coupled to the contact $C'$ of the switch mechanism. The terminal $B^\times$ is coupled to the contact $B'$, and this contact is coupled through a resistance R with the contact $B^2$.

The switch-lever D is coupled with one conductor E of a supply-main and the terminal $A^\times$ is coupled to the other conductor $E'$.

For starting the motor the switch-lever D is turned into the position shown in the drawing. Current then passes through the resistance R and running-coils A at the same time that it also passes through the starting-coils B. When the motor has attained sufficient speed to allow of its being driven synchronously, the switch-lever is moved over into its opposite position. Current then passes direct through the coils A without passing through the resistance, and no current is passed through the starting-coils B.

I claim—

An alternating-current motor in which the starting-coils are of numerous turns and relatively high self-induction as compared with the running-coils and in which a resistance is added at starting to the circuit through the running-coils substantially as described.

WALTER LANGDON-DAVIES.

Witnesses:
 FRED C. HARRIS,
 WILFRED CARPMAEL.